3,296,915
CUTTING DEVICE
Gaylen D. Johnson, North Sacramento, Calif.
(5540 Sapunor Way, Carmichael, Calif. 95608)
Filed Nov. 19, 1964, Ser. No. 412,404
2 Claims. (Cl. 83—564)

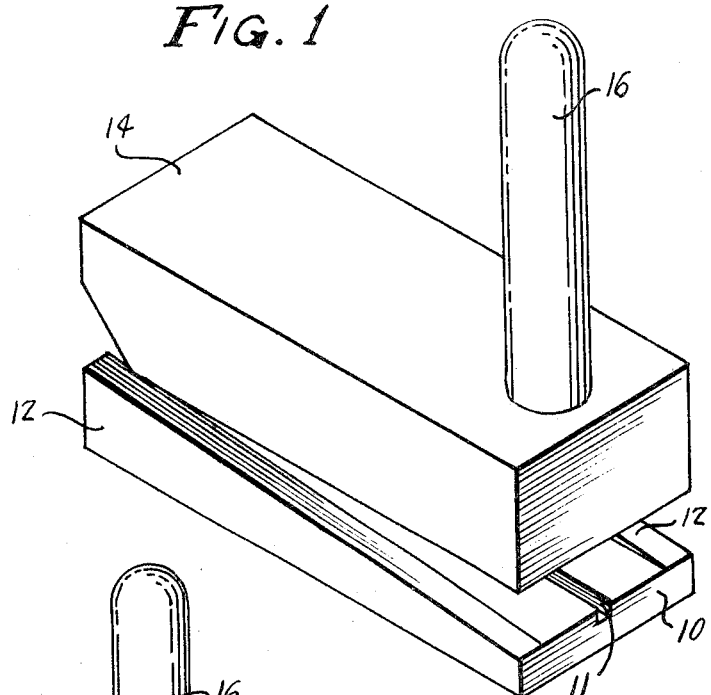
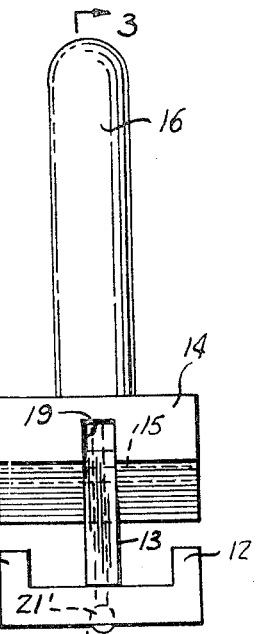
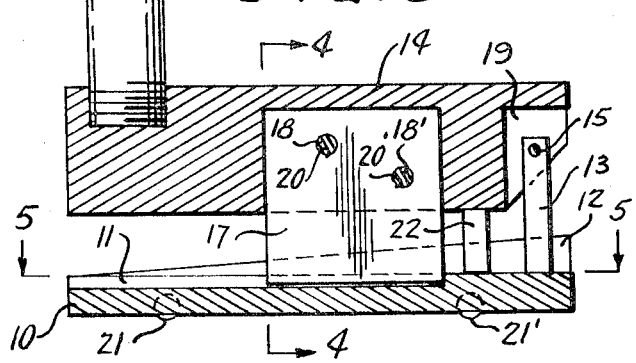
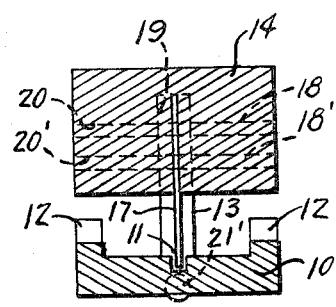
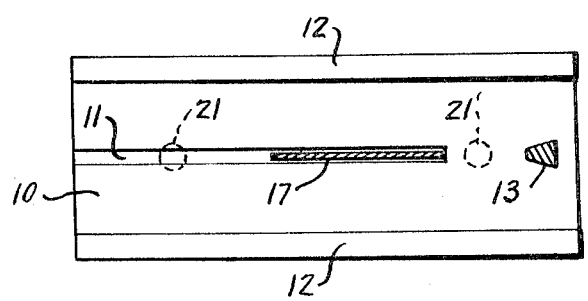

This invention relates to improvements in cutting devices and more particularly to tools used for the purpose of cutting such materials as sheet lead, linoleum and other thin materials.

The primary object of this invention is to provide a cutting device which is simple in construction, easy to use and which affords reliable and accurate cuts in linoleum and the like.

A further object is to provide a novel blade carrier which positions a blade in a predetermined position so that blades may be interchanged without changing the locations of the cuts made by the cutting device.

A still further object is to provide a cutting device of the nature set forth wherein the cutting blade is protected from misuse so that the life of the cutting blade is prolonged.

Other objects will be apparent from the following specification.

In the drawings:

FIGURE 1 is a perspective view of the invention;

FIGURE 2 is a rear view of the invention;

FIGURE 3 is a cross-sectional view taken along lines 3—3 of FIGURE 2, showing the cutting blade in profile positioned in the cutting block;

FIGURE 4 is a cross-sectional view taken along lines 4—4 of FIGURE 3; and

FIGURE 5 is a cross-sectional view of the invention taken along lines 5—5 of FIGURE 3.

Referring to the drawings which illustrate a preferred embodiment of the invention, a cutting base 10 has a blade slot 11 therein and has guide walls 12 which are sloped downward and are extended beyond the base 10. A pivot rod 13 extends upwardly from said base and has a cutting block 14 affixed at one end thereof by a pivot pin 15.

The cutting block 14 is adapted to be pivoted about said pivot pin. A cutting block handle 16 is affixed to the cutting block at one end thereof. A cutting blade 17 is attached to the cutting block by the blade pins or screws 18 and 18'. A pivot rod clearance slot 19 gives the cutting block sufficient clearance when pivoting about said pivot rod. Cutting block brake member 22 serves to protect the cutting blade 17 from penetrating into the cutting base.

The cutting block 14 is of substantial bulk as is the cutting base 10, although said base is of lesser bulk than is the cutting block. As an example of the dimensions, cutting block 14 may be formed 2 inches wide by 5 inches long by 1¼ inches deep. The cutting blade 17 can be inserted into a slot provided therefor in the block 14 and is secured to said block by inserting screws or pins 18, 18' through screw holes 20, 20' in said block.

The cutting base 10 is of dimensions 2 inches wide by 5 inches in length and has a thickness of approximately ⅜ inch. The guide walls 12 are ¼ inch thick and slope from approximately ¾ inch above the base to a flush position with the base.

In operation the material to be cut is inserted onto the cutting block over the blade slot 11 and is guided between the guide walls to a cutting position, the cutting block being raised by lifting on the handle 16. The cutting block is forced down onto the cutting base so that cutting blade 17 will sever the material to be cut. The cutting block in this operation is pivoted about the pin 15.

Ball bearings 21, 21' are provided in the base to allow the base to be shifted over a floor, for example, so that linoleum may be readily cut at various locations.

In a preferred form of the invention, the cutting device may be made from light metal such as aluminum or magnesium. The cutting blade will be made from stainless steel or other noncorrosive material. This will permit cleaning the blade with water to remove tar, etc. therefrom collected on the blade during the cutting operation without danger of rusting the blade. It will also be understood that the rectangular shape of the cutting blade is not critical, and that other blade shapes having cutting surfaces thereof which press flush with the cutting base may be employed in place of the rectangular blade which I have shown.

The cutting block, together with the cutting blade pins, holds the cutting blade rigidly in the cutting block so that it will not tilt when pressure is applied to the cutting block. Thus the danger of spoiling the work is eliminated.

The readily removability of the cutting blade from the cutting block mentioned above is of particular advantage since this enables new cutting blades to be inserted in the cutting tool. Furthermore, it is contemplated that the cutting blade may be of a reversible nature having cutting edges on two faces thereof. When such blades are used, it is a simple operation to remove the cutting blade from the cutting tool and to reverse and re-insert the cutting blade in the cutting tool with the second edge in cutting position.

Although I have described a preferred form of my invention, other variations thereof will be obvious to those skilled in the art to which it pertains without departing from the spirit or scope of my invention. Therefore, I do not desire to be limited to the disclosure set forth above but desire to avail myself of the various modifications and variations hereof as come within the scope of the appended claims.

What is claimed is:

1. A device for cutting sheet material comprising an elongated base having a central longitudinal slot open at one end extending partially through said base for a major portion of its length; side guide walls on each side of said base tapering upwardly from a low point adjacent the open end of said slot to a high point at the opposite end, a pivot rod extending upwardly from a central point on said base adjacent the high points of said guide walls, a generally rectangular cutting block having a pivot rod clearance slot in one end pivoted at said one end to said pivot rod, the lower end portion of said block adjacent said one end being angularly cut away, said block having a blade holding slot in the under side thereof and a pair of transverse bores intersecting said blade holding slot, a cutting blade in said blade holding slot having a cutting edge projecting into said longitudinal slot and having openings therein aligned with said bores, pins extending through said bores and openings releasably holding said blade in said blade holding slot, a stop pin on the underside of said block between said blade and said pivot pin limiting the downward movement of said cutting edge, and an operating handle on the upper side of said blade.

2. The cutting tool of claim 1 wherein said cutting base has a plurality of ball bearings attached at the bottom thereof.

References Cited by the Examiner

UNITED STATES PATENTS

| | | | |
|---|---|---|---|
| 42,003 | 3/1864 | Lamplugh | 83—605 |
| 274,732 | 3/1883 | Demain | 83—607 |
| 486,917 | 11/1892 | Walker | 83—607 X |
| 677,205 | 6/1901 | Hackett | 83—467 X |
| 928,019 | 7/1909 | Bartow | 83—467 |
| 2,440,527 | 4/1948 | Talley | 16—24 X |
| 2,564,156 | 8/1951 | Eden | 83—608 X |
| 2,659,926 | 11/1953 | Wein | 16—24 |

FOREIGN PATENTS

| | | |
|---|---|---|
| 419,616 | 1/1911 | France. |
| 599,004 | 3/1948 | Great Britain. |

WILLIAM S. LAWSON, *Primary Examiner.*

F. T. YOST, *Assistant Examiner.*